United States Patent
Kulkarni

(10) Patent No.: US 9,230,340 B2
(45) Date of Patent: Jan. 5, 2016

(54) IMAGING SYSTEMS WITH PROGRAMMABLE FIXED RATE CODECS

(71) Applicant: Semiconductor Components Industries, LLC, Phoenix, AZ (US)

(72) Inventor: Prajit Kulkarni, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 237 days.

(21) Appl. No.: 13/870,801

(22) Filed: Apr. 25, 2013

(65) Prior Publication Data

US 2013/0293738 A1 Nov. 7, 2013

Related U.S. Application Data

(60) Provisional application No. 61/642,952, filed on May 4, 2012.

(51) Int. Cl.
*G06T 9/00* (2006.01)
*H04N 19/63* (2014.01)
*H04N 19/124* (2014.01)
*H04N 19/152* (2014.01)
*H04N 19/18* (2014.01)
*H04N 19/625* (2014.01)

(52) U.S. Cl.
CPC .............. *G06T 9/00* (2013.01); *H04N 19/124* (2014.11); *H04N 19/152* (2014.11); *H04N 19/18* (2014.11); *H04N 19/625* (2014.11); *H04N 19/63* (2014.11)

(58) Field of Classification Search
CPC ....... H04N 19/61; H04N 19/46; H04N 19/60; H04N 19/124; H04N 19/13; H04N 19/146; H04N 19/12; H04N 19/176; H04N 19/63; H04N 19/1883; H04N 19/625; H04N 1/3217; G06F 17/148; G06T 9/00
See application file for complete search history.

(56) References Cited

U.S. PATENT DOCUMENTS 5,263,100 A * 11/1993 Kim et al. ...................... 382/166
5,323,187 A * 6/1994 Park ........................... 375/240.04
5,416,604 A * 5/1995 Park ............................... 382/232

(Continued)

OTHER PUBLICATIONS

Park et al., "Analysis on Color Filter Array Image Compression Methods" Unpublished manuscript. Department of Electrical Engineering, Stanford University. <www.stanford.edu/~mamakar/mentorship/park-no.pdf.>.

(Continued)

*Primary Examiner* — Jingge Wu
(74) *Attorney, Agent, or Firm* — Treyz Law Group, P.C.; Michael H. Lyons

(57) ABSTRACT

An imaging system may be provided having an image sensor and a fixed-rate codec for encoding image data from the image sensor into a fixed-rate bitstream. The image sensor may include an array of image pixels with a corresponding Bayer pattern array of color filter elements. The codec may include circuits for partitioning the image data into fixed-size blocks of image data and compressing the image data in each fixed-size block based on the image content in that block using a logarithm-based quantization of selected transform coefficients. The available bits for each block may be allocated to various components such as color components of the data based on the complexity of the image content in each component. The bitstream may include header information with pointers to coefficient locations within each block. The header information may be compressed prior to insertion into the bitstream.

18 Claims, 5 Drawing Sheets

(56) References Cited

U.S. PATENT DOCUMENTS

| | | | | |
|---|---|---|---|---|
| 6,122,400 | A * | 9/2000 | Reitmeier | 382/166 |
| 2004/0170335 | A1* | 9/2004 | Pearlman et al. | 382/240 |
| 2005/0099515 | A1* | 5/2005 | Tsuruoka | 348/241 |
| 2005/0280719 | A1* | 12/2005 | Kim et al. | 348/231.2 |
| 2006/0146930 | A1* | 7/2006 | Kim et al. | 375/240.03 |
| 2008/0013844 | A1* | 1/2008 | Hu | 382/240 |
| 2011/0235654 | A1* | 9/2011 | Jones et al. | 370/465 |
| 2012/0294362 | A1* | 11/2012 | Sikora et al. | 375/240.14 |
| 2013/0243080 | A1* | 9/2013 | Leontaris et al. | 375/240.02 |

OTHER PUBLICATIONS

Toi et al., "A Subband Coding Technique for Image Compression in Single CCD Cameras with Bayer Color Filter Arrays", IEEE Transactions on Consumer Electronics, Feb. 1999, vol. 45, No. 1, pp. 176-180.

Lee et al., "A Novel Approach of Image Compression in Digital Cameras with a Bayer Color Filter Array" Proceedings—International Conference on Image Processing,IEEE; Oct. 2001, vol. 3, pp. 482-485.

Koh et al., "New Efficient Methods of Image Compression in Digital Cameras with Color Filter Array" IEEE Transactions on Consumer Electronics, Nov. 2003, vol. 49, No. 4, pp. 1448-1456.

Bazhyna et al., "Lossless Compression of Bayer Pattern Color Filter Arrays" Proceedings—SPIE The International So Society for Optical Engineering, pp. 378-387, Image Processing: Algorithms and Systems IV; 2005, vol. 5672.

Gastaldi et al., "Compression of Videos Captured via Bayer Patterned Color Filter Arrays" Proceedings—13th European Signal Processing Conference. 2005, Antalya, Turkey.

Xie et al., "A Near-lossless Image Compression Algorithm Suitable for Hardware Design in Wireless Endoscopy System" EURASIP Journal on Applied Signal Processing, Sep. 12, 2005, vol. 2007, Article 82160, pp. 1-12.

Xie et al., "A Novel Method of Lossy Image Comprssion for Digital Image Sensors with Bayer Color Filter Arrays" Prooceedings—IEEE Symposium on Circuits and Systems, 2005, vol. 5, pp. 4995-4998.

Zhang et al., "Real-time Lossless Compression of Mosaic Video Sequences" Real Time Imaging—Special issue Mult-Dim. Img. Proc., Oct.-Dec. 2005, vol. 11, No. 5-6, pp. 370-377.

Lukac et al., "Single-Sensor Camera Image Compression" IEEE Transactions on Consumer Electronics, vol. 52, No. 2, pp. 299-307.

Zhang et al., "Lossless Compression of Color Mosaic Images" IEEE Transactions on Image Processing, Jun. 2006, vol. 15, No. 6, pp. 1379-1388.

Chung et al., "A Lossless Compression Scheme for Bayer Color Filter Array Images" Department of Electronic and Information Engineering, The Hong King Polytechnic University, Hong Kong.

Doutre et al., "H.264-Based Compression of Bayer Pattern Video Sequences" IEEE Transactions on Circuits and Systems for Video Technology. Jun. 2008, vol. 8, No. 6, pp. 725-734.

Marcellin, JPEG2000: Image Compression Fundamentals, Practice and Standards. 2002, Massachusetts: Kluwer Academic Publishers.

Bhaskaran, "Image and Video Compression Standards: Algorithms and Architectures" 2003, Massachusetts: Kluwer Academic Publishers.

Rout, "Orthogonal vs. Biorthogonal Wavelets for Image Compression" Virginia Polytechnic Institute and State University, Aug. 21, 2003, Blacksburg, VA. <http://scholar.lib.vt.edu/theses/available/etd-09172008-111540/unrestricted/Etdset.pdf>.

Ji et al., "Shape Adaptive Discrete Wavelet Transforms for Arbitrarily Shaped Visual Object Coding" Lehigh University, Department of EECS, Bethalem, PA. IEEE Transactions on Circuits and Systems for Video Technology, Aug. 2000, vol. 10, No. 5, pp. 725-743.

Wiegand et al., "Overview of the H.264/AVC Video Coding Standard" Jul. 2003, IEEE Transactions on Circuits and Systems for Video Technology, vol. 13, No. 7, pp. 560-576.

Malvar et al., Low-Complexity Transform and Quantization in H.264/AVC, Jul. 2003, IEEE Transactions on Circuits and Systems for Video Technology, vol. 13, No. 7, pp. 598-603.

Schobben. "Dithering and Data Compression" Eindhoven University of Technology, 1995. <http://schobben.net/documents/thesis.pdf.>.

Paul et al., "A Fast Hardware Approach for Approximate, Efficient Logarithm and Antilogarithm Computations" Feb. 2009. IEEE Transactions on Very Large Scale Integration (VLSI) Systems, vol. 17, No. 2. pp. 269-277.

\* cited by examiner

IMAGING SYSTEMS WITH PROGRAMMABLE FIXED RATE CODECS

This application claims the benefit of provisional patent application No. 61/642,952, filed May 4, 2012, which is hereby incorporated by reference herein in its entirety.

BACKGROUND

This relates generally to imaging systems, and more particularly, to imaging, systems with image data encoders and image data decoders.

Modern electronic devices such as cellular telephones, cameras, video cameras and computers often use digital image sensors. Imagers (i.e., image sensors) may include a two-dimensional array of image sensing pixels. Each pixel receives incident photons (light) and converts the photons into electrical signals.

Image data generated based on the pixel signals is commonly encoded into a bitstream that is provided to additional image processing circuitry on the image sensor or to additional circuitry that is coupled to the image sensor. Conventional encoder/decoders, commonly referred to as codecs, aim to meet various data specifications such as 12-bit input image data acceptance, fixed-rate encoding, random access to the compressed bitstream for region-of-interest (ROI) access, visually lossless image quality, and minimal hardware complexity. Various codecs exist that meet some of the above-listed specifications, however, no conventional codec meets all of the above specifications.

It would therefore be desirable to provide improved codecs or imaging systems.

DETAILED DESCRIPTION

Imaging systems such as digital camera modules are widely used in electronic devices such as digital cameras, video cameras, computers, cellular telephones, and other electronic devices. These electronic devices may include image sensors that gather incoming light to capture an image. The image sensors may include image pixel arrays (i.e., arrays of image pixels). The pixels in the image pixel arrays may include photosensitive elements such as photodiodes that convert the incoming light into digital data.

Figure 1:
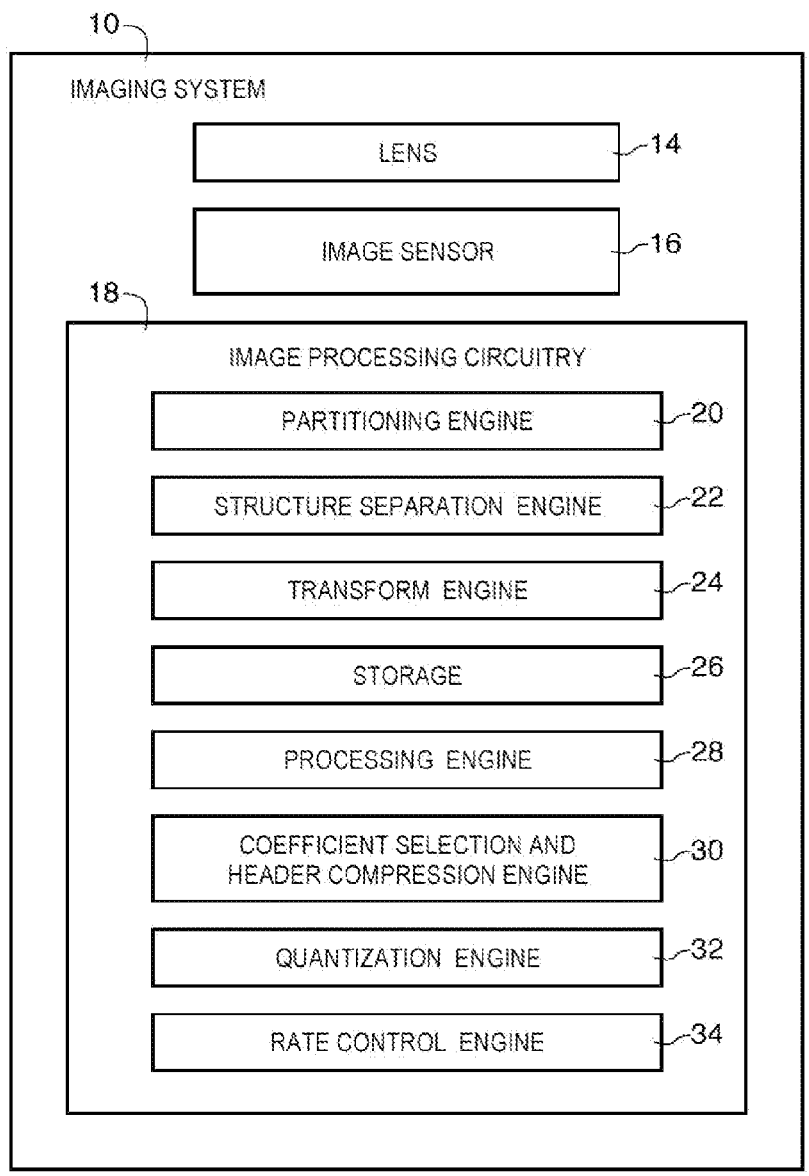
FIG. 1 is a schematic diagram of an illustrative electronic device that includes a codec in accordance with an embodiment of the present invention.

An imaging system that may be included in an electronic device is shown in FIG. 1. Imaging system 10 may be implemented as a digital camera, a video camera, a computer, a cellular telephone, a medical device, or other electronic device. Imaging system 10 may include one or more lenses such as lens 14 that focus image light onto one or more corresponding image sensors such as image sensor 16. Image sensor 16 may include one or more image pixel arrays. The image pixels of image sensor may include photosensitive elements (e.g., photodiodes) that convert the light into digital data. Image pixel arrays may have any number of pixels (e.g., hundreds, thousands, millions, or more). A typical image pixel array may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory e.g., buffer circuitry), address circuitry, and/or compression circuitry.

System 10 may include an image signal processor (ISP) such as Image processing circuitry 18. Circuitry 18 may sometimes be referred to herein as a coder/decoder or a coder. Image processing circuitry 18 may receive image data from image sensor 16, encode the image data into a compressed bitstream, and output the compressed bitstream. The compressed bitstream may be provided to additional circuitry in an electronic device or additional circuitry within system 10. Raw image signals from image pixels in image sensor 16 may be converted to digital image data prior to compression by circuitry 18.

Circuitry 18 may be formed separately from image sensor 16 or image sensor 16 and circuitry 18 may be formed on a common semiconductor substrate, if desired.

As shown in FIG. 1, codec 18 may include partitioning engine 20 for partitioning image data into image data blocks structure separation engine 22 for separating color components of image data transform engine 24 for performing transformation operations such as discrete cosine transforms, discrete wavelet transforms, etc. on image data, storage 26 such as volatile or non-volatile memory, processing engine 28 for processing image data, coefficient selection and header compression engine 30 for selecting a subset of transform coefficients and compressing header data, quantization engine 32 for quantizing selected coefficients, and rate control engine for assigning and allocating bit rates for a compressed bitstream.

Figure 2:
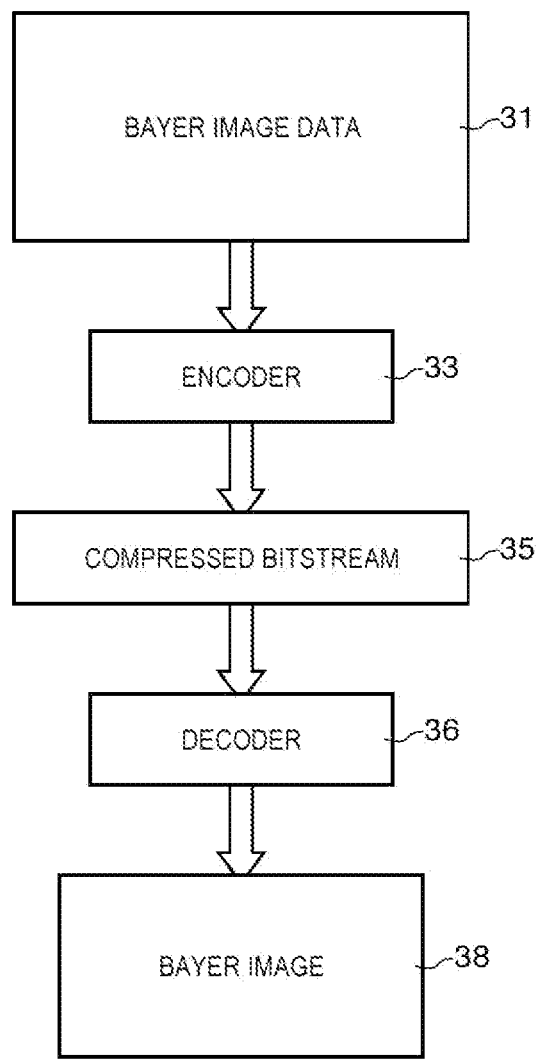
FIG. 2 is an illustrative diagram showing how image data may be encoded into a bitstream and the bitstream may be decoded to form an output image using a codec of the type shown in FIG. 1 in accordance with an embodiment of the present invention.

FIG. 2 is diagram showing how image data may be encoded into a compressed bitstream and the compressed bitstream may be decoded to form an output image. In the example of FIG. 2, image data such as Bayer image data 31 (e.g. image data generated by an array of image pixels having a Bayer pattern color filter array) may be provided to encoder 33.

Encoder 3 may include some or all of image processing circuitry 18 of FIG. 1. Encoder 33 may encode image data 31 to form compressed bitstream 35. Compressed bitstream 35 may be provided to decoder 36. Decoder 36 may be formed separately from encoder 33 or encoder 33 and decoder 36 may be formed from a common set of image processing circuitry such as image processing circuitry 18 of FIG. 1. Decoder 36 may obtain compressed bitstream 35 and decode the compressed bitstream to form an output image such as Bayer image 38. Output image 38 may be a complete image (i.e., may represent substantially all of image data 31) or may be a partial image such as an image of a region-of-interest (ROI) of an image (formed form a portion of image data 31).

Image data 31 may be 12-bit image data, 16-bit image data or may have another bit depth. Compressed bitstream 35 may be generated at a fixed rate by encoder 33 and may encode data 31 in such a way that a region of interest of an image can be located in the bitstream without requiring reconstruction of the entire image. For example, in facial recognition or code scanning operations, a portion of an image containing a face or a bar code respectively may be of particular interest. The efficiency of such a system may be enhanced by providing the system with a bitstream in which the ROI in the image can be extracted directly from the bitstream.

The fixed-rate bitstream may be a fixed-rate bitstream at the granularity of image blocks. Each image block may be encoded into a portion of the bitstream that has a common size (e.g., a common number of available bits) and that is output at a common rate. However, within each image block, available bits may be allocated differently from the way in which available bits are allocated in other image blocks. The available bits may be allocated based on the content of the image data in that image block. For example, a particular image block may have a large amount of detail in the green component of the image data for that image block and relatively smaller amounts of detail in the red and blue components of the image data for that image block. The available bits in the portion of the bitstream associated with that image block may therefore be predominantly used to encode the green image data in that image block (e.g., 80 percent of the available bits may be used to encode the green image data while 10 percent of the available bits are used to encode the red image data and 10 percent of the available bits are used to encode the blue image data).

Figure 3:
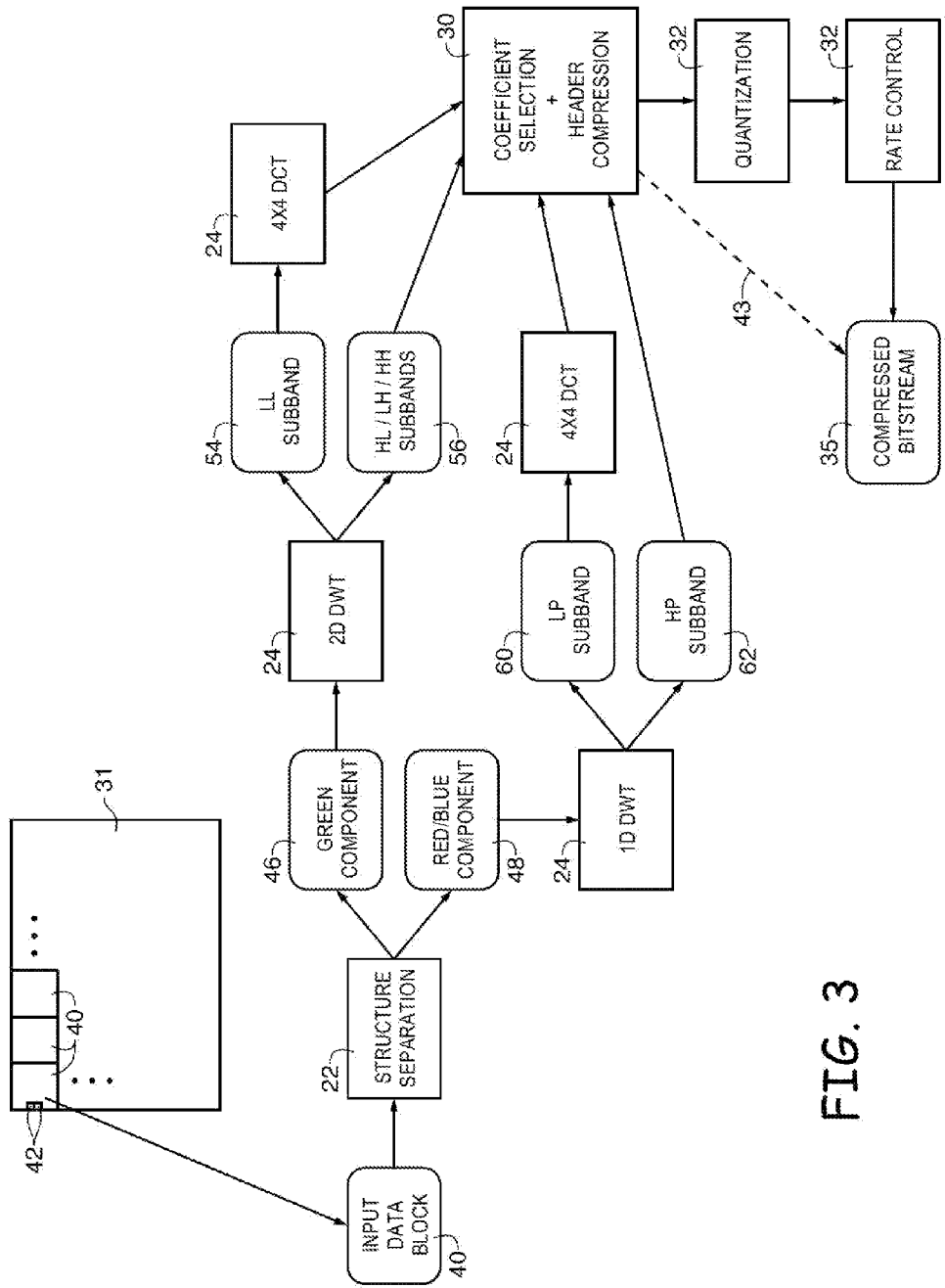
FIG. 3 is a flow diagram showing how image data may be encoded into a compressed bitstream in accordance with an embodiment of the present invention.

FIG. 3 shows various processing steps and intermediate stages of data in the process of generating a compressed bitstream from image data using a system of the type shown in FIG. 1. As shown in FIG. 1, image data 31 (e.g., an array of Bayer pattern image data may be partitioned (e.g., using partitioning engine 20 of circuitry 18) into blocks 40 of a fixed size. Each block 40 may include a common number of image pixels 42. In one suitable example that is sometimes described herein as an example, each block 40 may be an 8×16 block of image pixels (e.g., a block of image pixels having 8 pixel rows and 16 pixel columns. However, this is merely illustrative. If desired, each block 40 may be a fixed-size block containing any number of pixel rows and pixel columns. Each block 40 may be compressed independently. Block 40 may be pre-processed to generate a rectangular green component 46, and rectangular red and blue components 48 (e.g., using structure separation engine 22). Data redundancy in components 46 and 48 may be reduced using transform engine 24 and coefficient selection and header compression engine 30. Transformation engine 24 may perform one or more transformation operations on each component 46 and 48. In the example of FIG. 3, green component 46 undergoes a two dimensional discrete wavelet transformation (DWT) to generate low-low (LL) subband data 54 and high-low (HL), low-high (LH), and high-high (HH) subband data 56, LL subband data 54 may be transformed again using a 4×4 discrete cosine transform (DCT). Subband data 56 and the DCT transform of subband data 54 may be provided to coefficient selection and header compression engine 30.

In parallel, red and blue components 48 may undergo a one-dimensional DWT to generate low-pass (IP) subband data 60 and high-pass (HP) subband data 62. LP subband data 60 may undergo a 4×4 DCT. HP subband data 62 and the DCT of LP subband data 60 may be provided to coefficient selection and header compression engine 30.

Engine 30 may be used to select a subset of the coefficients generated by the transform operations performed by engine 24. The solution to the bit rate problem lies in reducing the number of transmitted coefficients without affecting image quality. This is accomplished by the application of the integer 4×4 DCT to the LL subband, which provides the ability to discard some of the coefficients from the bitstream. This selection of a subset of the coefficients can lead to some overhead since location information from each subband is transmitted. Header data containing the location information may be compressed using a look-up based technique (e.g., using selection and header compression engine 30) before being included in the bitstream.

As shown by line 43, the compressed header information may be provided directly into the bitstream. The selected coefficients (e.g., the DCT and DWT coefficients) are quantized using quantization engine 32 to generate a fixed-rate bitstream. Since the quantization engine 32 and the rate control engine 34 do not communicate, the quantization engine 32 may generate fixed-length codewords which can be easily modified by rate control engine 34 to meet rate constraints.

This type of data scalability is the characteristic of an embedded quantization engine 32 in which a single quantized codeword can be decoded at different rates and/or quality as required. Quantization engine 32 may quantize the coefficients using a regular mode or a direct mode. The regular mode may be used for coefficients with magnitudes greater than 255. The direct mode may be used for coefficients with magnitude less than 256. Both modes produce an output value that can be signed or unsigned, but is always 8 bits in length. For a signed coefficient, the most significant bit (MSB) is reserved for the sign bit and the lower 7 bits are occupied by the magnitude. For an unsigned coefficient one additional bit of magnitude can be transmitted since the sign bit is unnecessary. Since the DCT DC coefficients are the only unsigned coefficients, there is no overhead in signaling this information. Decoder 36 (see FIG. 2) may know in advance when it should expect an unsigned coefficient.

In the regular mode, quantization engine 32 computes the log value of the magnitude of each coefficient and appends the sign bit as the MSB of each codeword. The log value consists of an integer part and a fractional part, each of which has a fixed width. In one suitable example, the integer part of the log value has a length of 4 bits. In the regular quantization mode, the engine 34 varies the bit rate of each codeword by retaining a varying number of fractional bits. The integer part is never truncated since this would lead to large reconstruction errors. Codewords of varying coarseness (equivalent to fractional precision in this case) can therefore be produced from a single output from engine 32.

In the direct mode, (e.g., when the magnitude of the input coefficient is less than 256), the integer portion is at most equal to seven. Hence, the MSB of the four-hit integer part of the log value is zero. Furthermore, transmitting a small number of the more significant bits of magnitude would require less processing than computing the log value, and would be equally accurate. For a magnitude of less than 256, the most significant 6 (for signed data) or 7 (for unsigned data) bits of magnitude are output directly. The MSB of the output is the sign bit, and the second most significant bit is set to zero as an indication that the direct mode is being used.

Rate control engine 34 works as an open loop with no feedback to the quantization engine 32, and performs bit allocation using certain preset rules. These rules are based on a context made up of the values of two counters, which are continuously updated, and on the magnitude of the coefficient being processed. The same contexts and update rules are used by decoder 36 and need not be communicated via the compressed stream. This reduces both bit overhead and system complexity.

A target bit rate for each block 40 may be set by the user of system 10. Codec 10 may be able to generate bitstreams having a variety of target bit rates. For example, for 12-bit image data, the target bit rate may be any value greater than or equal to 4.75 bpp in increments of 0.123 bpp.

Rate control engine 34 may perform rate assignment and rate allocation operations. Rate assignment operations may include reserving a certain number of bits to each coefficient before encoding. Rate allocation operations may include encoding a coefficient with an appropriate number of bits that is more or less than the reserved number of bits.

During rate assignment operations, the coefficients that are selected for encoding are assigned bit rates based on their relative significance in improving reconstructed image quality. The four lowest frequency DCT coefficients may therefore be assigned 7 bits each, whereas the remaining DCT coefficients may be assigned 6 bits each. Similarly, all of the high-pass coefficients may be each assigned 6 bits. This may be true for all three color components, and the number of bits that are pre-assigned in this manner forms the nominal bit rate for each coefficient. In the example described above in which each pixel block is an 8×16 block of image pixels, the nominal bit rate for the entire pixel block is then the sum of the nominal bit rates for 99 encoded coefficients and any signaling overhead (as an example for 12-bit image data). Adding up the nominal bits for each coefficient and the signal bits may then yield a nominal bit rate of 660 bits for each block in the current example. However, the numbers described above are merely illustrative. If desired, other block sizes (and other corresponding numbers of encoded coefficients with other associated nominal bit rates) may be used.

Encoder 33 and decoder 36 may both maintain a state machine that is identically initialized and updated. The state machine may consist of two variables. The first variable may be the number of remaining coefficients that can be subjected to rate control and the second variable may be the number of excess bits. These variables are initialized according to a current coding mode, and may be updated as the rate control process progresses at the encoder. The same update rules are also used at the decoder to maintain synchronization.

Coefficients may be partitioned into rate control coefficients (i.e., those coefficients that can be subjected to rate control) and non-rate control coefficients (i.e., those coefficients that cannot be subjected to rate control). The coefficients that are selected for rate control can undergo bit reduction (to meet rate limitations) which reduces their reconstruction accuracy. Hence, the categorization of coefficients in each coding mode described below is made to ensure that image quality is not compromised to meet rate requirements. Coefficients arising from the DCT blocks of all three color components are exempt from rate control operations (due to the importance of reproducing these coefficients as accurately as possible for better image quality). For the green component, coefficients selected from the three high-pass subbands are subjected to rate control operations. For each of the other two components, the high-pass coefficients are included in rate control operations.

During rate allocation operations the length of each codeword may be varied depending on the context of the encoder state machine and the magnitude of the current coefficient. Coefficients may be encoded with varying hit rates based on their magnitudes. The bit rate assignment operations described above for different subsets of coefficients assumes that all such coefficients have large enough magnitudes to warrant the nominal rate. This might not be always true. The compression efficiency may therefore improve during rate allocation operations in which coefficients of small magnitude are allocated bit rates that are smaller than their nominal allocated rates and coefficients of larger magnitude are allocated bit rates that are larger than their nominal allocated rates.

Figure 4:
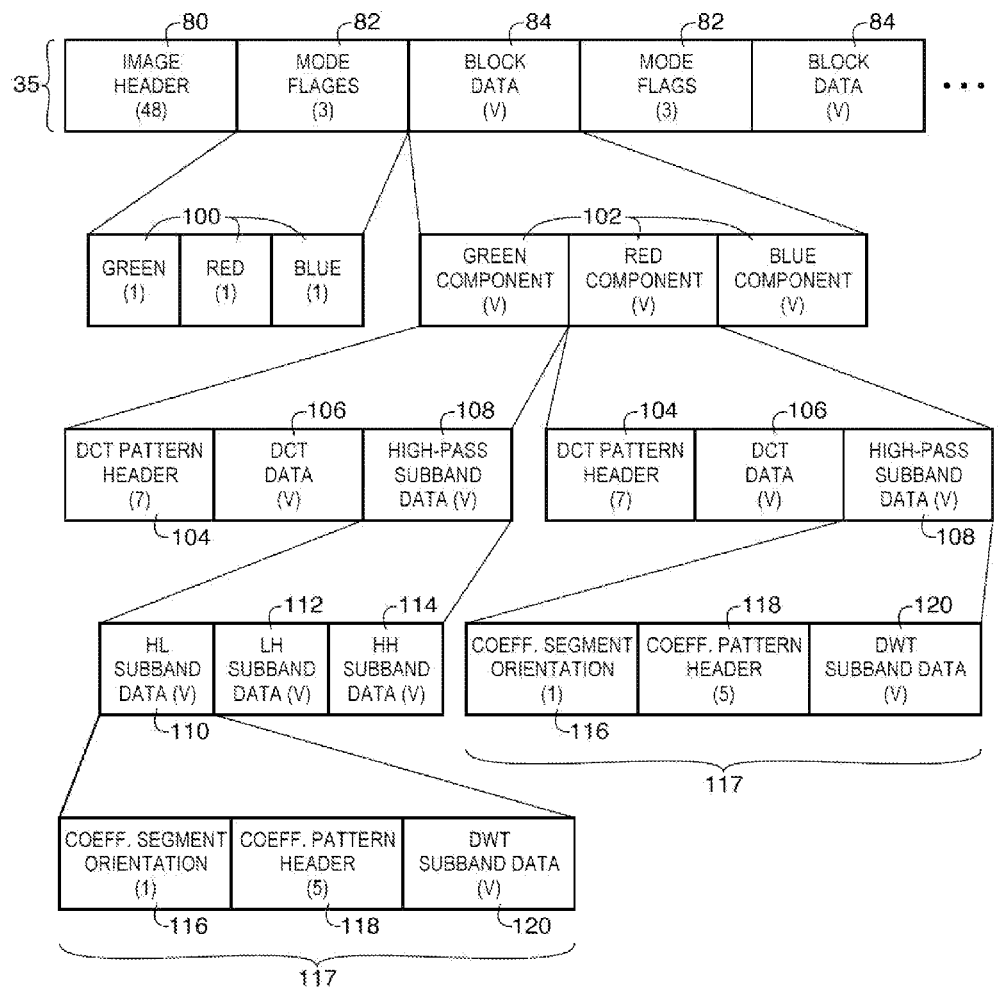
FIG. 4 is a diagram of an illustrative compressed bitstream in accordance with an embodiment of the present invention.

FIG. 4 shows the various components of compressed bitstream 35. The number of bits used by each element of the bitstream is indicated by the number in parenthesis. Elements with variable length have the letter "v" in the corresponding parenthesis. As shown in FIG. 4, compressed bitstream 35 may include image header 80. Image header 80 may have a fixed size of 6 bytes (48 bits). The first byte may be divided into two nibbles. The upper 4 bits may contain the bit depth of the image reduced by one. Thus, the codec 10 may be used to encode data having a bit depth of as many as 16-bits. In configurations in which 12-bit data is encoded, the lower 4 bits may be unused. The next two bytes of image header 80 may indicate the number of blocks in the horizontal dimension of the image. The two following bytes may similarly indicate the number of vertical blocks. The last header byte may be the bit rate per block expressed as a multiple of 16. If desired, these header elements could be perceived as system parameters that could be communicated ahead of time.

Bitstream 35 may include coding mode flags 82. The first 3 bits of data (e.g., bits 100) from every block may indicate the coding modes used for the green, red and blue components of the block, respectively, starting with the MSB.

Following the block header data, bitstream 35 may include data from the green, red and blue components 102 for each block 40 in block data 84. Within each component 102, data from the DCT block (e.g., DCT pattern header 104 and DCT data 106) may appear before that from the high-pass wavelet subbands (e.g., high-pass subband data 108). For the green component with three high-frequency subbands, the subbands may appear in raster scan order (e.g., HL subband data 110, LH subband data 112, and HH subband data 114). The red and green components may each contain one such subband structure.

The compressed DCT coefficient pattern header 104 occupies the first 7 bits of the DCT block data. The rest of the DCT block data is made up of variable rate quantized coefficient data 106. Data 108 from each high-pass subband is arranged in a common structure 117. The first bit 116 of a structure 117 may indicate the selected orientation of the coding segments in the subband. Vertical segments may be indicated by a value of zero and horizontal segments may be indicated by a value of 1. The next 5 bits may hold compressed coefficient pattern header 118. Header 118 may indicate the coefficient segments that are encoded. This may be followed by the variable rate quantized wavelet transformation coefficient data 120.

The data processing and bitstream structures described above in connections with FIGS. 3 and 4 are merely illustrative. In some situations, blocks 40 may include image data that is relatively smooth (e.g., lacks a large amount of spatial structure). In this type of flat-field situation, image data 31 may be compressed using fewer bits than usual using a flat-field version of the operations described above when a flat field is detected by encoder 33. The flat-field mode of operation may be flagged for each component using flat-field bits in the block header.

A flat field may be detected by analyzing the results of the DWT. For example, the mean of the absolute values of the LL/LP subband coefficients may be used as reference. The sum of absolute values of each of the LH, HL, and HH subbands (or the HP subband) may then be compared to this reference. If all the sums are lower than the reference value, a second set of checks may be performed. The maximum magnitude in each of the high-pass subbands may be computed. If each of the three values is less than a nominal threshold, a flat field, is signaled and flat-field processing is employed.

In the flat-field mode of processing, all 16 DCT coefficients may be selected for encoding. Similarly, all 16 coefficients in each high-frequency subband of the component may also be encoded. A dedicated set of three header bits may be used to indicate whether any of the components is being processed in this mode. The flag for each component that is flat-field processed may set to 1, and the other bits may be set to zero. Although a greater number of coefficients are encoded in this mode, the total hit rate still remains comparable to (red and blue) or lower than (green) that of the non-flat-field processing mode described above.

The flat-field processing mode may include changes to the rate control processing, of rate control engine 34. Coding mode flags 82 may indicate whether the non-flat-field or flat-field processing has been used for the green, red and blue components of the block. A value of zero may indicate the normal (non-flat-field) coding mode and a value of one may indicated the flat-field coding mode. The mode flag for all the components of the block may be used by decoder 36 to set up the state machine and the rate control mechanism.

In the flat-field processing mode, during rate assignment operations, the four lowest frequency DCT coefficients may be encoded as 8-bit values without performing rate control modifications. The remaining 12 DCT coefficients may be assigned 6 bits each and are included in rate control operations. The HP coefficients for each component may be excluded from rate control operations and encoded as 4-bit values. As in the non-flat-field mode, only the coefficients with a nominal rate of 6 bits are subjected to bit reduction rate control operations. The nominal assigned rate for the green component in the flat-field mode for a 12-bit depth input image is 27 bits lower than of the non-flat-field mode (in the case of 8×16 partitioning of the image array). The nominal assigned rate for the red or blue component is 1 bit more than of the non-flat-field mode.

In the flat-field processing mode, during rate allocation operations, the DCT coefficients are counted as rate control coefficients, whereas the high-pass coefficients are excluded from rate control modifications. As explained above, the four lowest frequency coefficients (e.g., the top left corner of a 4×4 array of coefficients) are encoded as 8-bit codewords. The remaining twelve DCT coefficients are assigned a nominal rate of 6 bits and are subjected to regular rate control modifications (e.g. rate reduction or increase).

The high-pass coefficients (e.g. 48 coefficients for the green component and 16 coefficients for the red/blue components) may be clipped at a magnitude of 127, encoded as special 4-bit values and not subjected to rate control modifications. This type of encoding is based on the characteristics of a flat-field region in which the high-pass coefficients are all of very small magnitude. The MSB of the codeword is the sign hit, and the remaining bits equal the 3 most significant bits in the 7-bit representation of the magnitude. For any magnitude greater than 127 (and less than 151), the magnitude may be clipped at 127 before encoding.

In the above example (e.g., 12-bit input data) the nominal rate for the green component in this mode is 27 bits lower than for the regular mode. The excess bit counter may be decremented by 9 before encoding begins, and by a further 18 after the green component has been processed. If the counter were to be decremented by 27 prior to the green component encoding, none of its DCT coefficients would be subjected to rate control (since the excess bit counter could go negative). This could lead to the inefficient use of the available bits.

Encoding the red or blue component in this mode requires 1 bit more than the regular mode. The excess bit counter is incremented, before the first green coefficient is encoded to avoid exceeding the target rate for the block.

Figure 5:
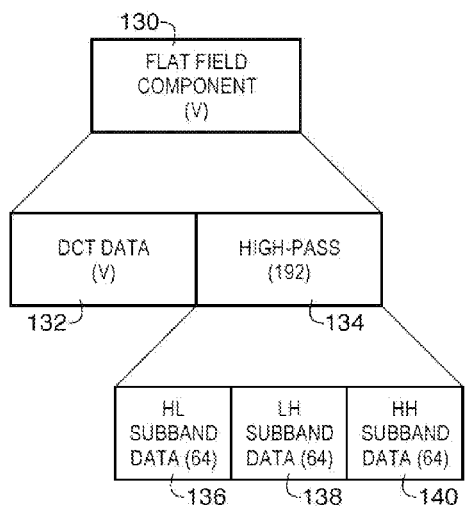
FIG. 5 is a diagram of an illustrative flatfield component of a compressed bitstream in accordance with an embodiment of the present invention.

FIG. 5 shows the structure of a flat-field component 130 of a block of data such as one of blocks 84 of FIG. 4. As shown in FIG. 5, since all the DCT and high-pass subband coefficients are encoded, the component data is devoid of any headers. While DCT coefficient data 132 has variable rate due to the rate control process, high-pass subband data 134 has a fixed-length of 64 bits per subband (e.g., a total of 192 bits for a green component with three high-pass subbands such as HE subband data 136, LH subband data 138, and HH subband data 140). Red and blue components each contain data from one high-pass wavelet subband.

Figure 6:
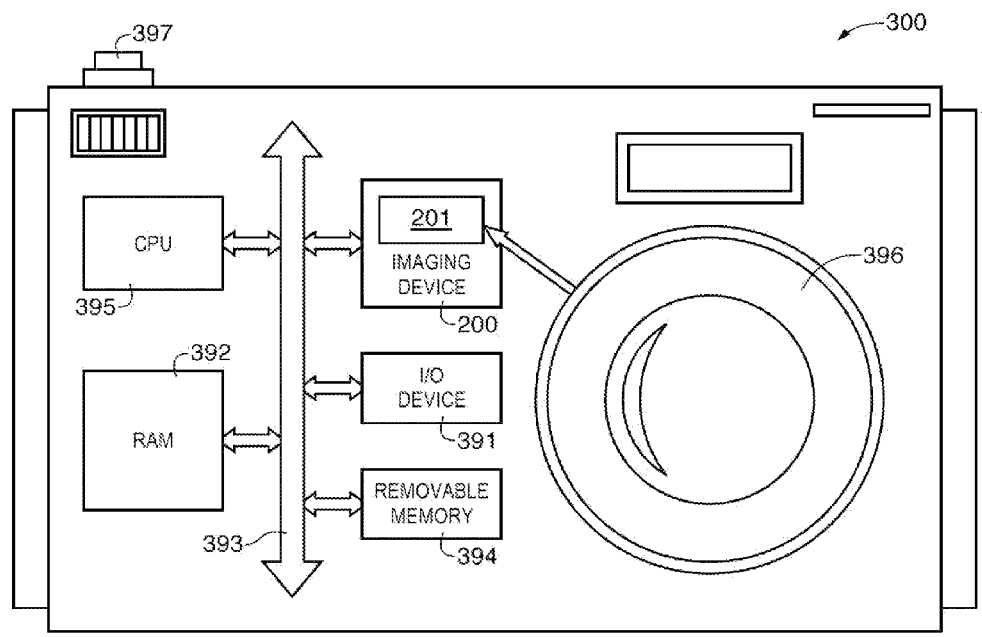
FIG. 6 is a block diagram of a processor system that may include a codec of the type shown in FIG. 1 in accordance with an embodiment of the present invention.

FIG. 6 shows in simplified form a typical processor system 300, such as a digital camera, which includes an imaging device such as imaging device 200 (e.g., an imaging, device 200 such as imaging system 10 of FIG. 1 employing a codec as described above in connection with FIGS. 1-6). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing, an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more imam flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating an imaging system that includes a fixed-rate codec for generating a compressed bitstream from Bayer image data. The codec can encode native image bit-depths that range from 12 bpp to 16 bpp and produces compressed bitstreams at rates of 4.75 bpp and higher. This translates to a minimum achievable compression ratio of 2.52:1. The target rate for the codec is variable and programmable in increments of 0.125 bpp. The variable target rate enables the system to be implemented in systems with differing bandwidth requirements.

Bayer input image data may be partitioned into blocks of a fixed size and each block may be independently encoded at the target hit rate. This feature helps achieve spatial scalability and enables the ROI functionality at the decoder.

Novel coefficient quantization and rate control schemes have been developed to enable independent encoding at the target bit rate. The quantization operations are based on a log function and enable open-loop operation of the rate controller to generate variable-length codewords. The rate control operations include a simple state machine to produce variable length codewords in order to meet the target bit rate. The codewords are designed to indicate the quantization mode without the need for external signaling. These codewords thus help minimize the overhead in signaling code lengths. Additionally, header compression is employed to reduce the amount of signaling data in the bitstream.

The foregoing is merely illustrative of the principles of this invention which can be practiced in other embodiments.

What is claimed is:

1. A method of variable-rate encoding of image data, comprising:
    capturing the image data using an array of image pixels having a corresponding array of color filter elements;
    partitioning the captured image data into fixed-size blocks of image data;
    separating each fixed-size block of image data into red, green, and blue color components;
    performing a one dimensional discrete wavelet transform on the red and blue color components;
    performing a discrete cosine transform on an output of the one dimensional discrete wavelet transform;
    compressing each fixed-size block of image data; and
    outputting an encoded bitstream for each fixed-size block at a fixed rate.

2. The method defined in claim 1 wherein compressing each fixed-size block of image data comprises:
    allocating available bits for each fixed-size block based on image content of the image data of each fixed-size block.

3. The method defined in claim 2 wherein allocating the available bits for each fixed-size block comprises:
    allocating a first number of bits to image data of a first color and allocating a second number of bits to image data of a second color based on a relative complexity of the image data of the first color and the image data of the second color.

4. The method defined in claim 1 wherein compressing each fixed-size block of image data further comprises selecting a set of coefficients associated with the transformation operations.

5. The method defined in claim 4 wherein compressing each fixed-size block of image data further comprises generating header information for the encoded bitstream, wherein the header information includes location information for image data in each fixed-size block.

6. The method defined in claim 1 wherein compressing each fixed-size block of image data further comprises performing logarithm-based quantization operations on the selected set of coefficients.

7. The method defined in claim 6, further comprising:
    allocating a number of bits for each coefficient in the selected set of coefficients;
    determining, for each coefficient, whether to allocate more bits or less bits than the allocated number of bits for that coefficient; and
    encoding each coefficient using an another number of bits that is based on the allocated number of bits for that coefficient and based on the determination of whether to allocate more bits or less bits than the allocated number of bits for that coefficient.

8. An imaging system for capturing image data and generating an encoded bitstream for outputting the captured image data, comprising:
    an image sensor having an array of image pixels configured to generate image signals;
    circuitry for generating digital image data from the generated image signals; and
    image processing circuitry comprising:
        a structure separation engine configured to separate the image signals into color component data;
        a transform engine configured to perform a discrete wavelet transform on the color component data and configured to perform a discrete cosine transform on an output of the discrete wavelet transform; and
        a coefficient selection and header compression engine configured to generate a fixed-rate bitstream based on the generated digital image data and to insert a compressed image header having a fixed size into the fixed-rate bitstream, wherein the fixed-rate bitstream includes encoded data for image blocks each having a fixed size and wherein the encoded data for each image block has been encoded based on content in the digital image data in that image block.

9. The imaging system defined in claim 8 wherein the circuitry is configured to generate 12-bit digital image data from the generated image signals.

10. The imaging system defined in claim 8 wherein the circuitry is configured to generate 16-bit digital image data from the generated image signals.

11. The imaging system defined in claim 8 wherein the image processing circuitry is configured to generate the fixed-rate bitstream by inserting a set of mode flags that indicate a processing mode for a set of color components of the digital image data into the fixed-rate bitstream.

12. The imaging system defined in claim 11 wherein the image processing circuitry is configured to generate the fixed-rate bitstream by inserting compressed block data for each image block into the fixed-rate bitstream.

13. The imaging system defined in claim 12 wherein the compressed block data for each image block includes variable length transform data and variable length high-pass subband data.

14. The imaging system defined in claim 13 wherein the variable length high-pass subband data of each image block includes variable length high-low subband data with variable length wavelet transformation data.

15. The imaging system defined in claim 14 wherein the high-low subband data includes a coefficient pattern header.

16. A system, comprising:
    a central processing unit;
    memory;
    input-output circuitry; and
    an imaging device, wherein the imaging device comprises:
        an image sensor configured to capture image data using an array of image pixels having a corresponding Bayer pattern array of color filter elements, and circuitry configured to partition the captured image data into fixed-size blocks of image data, separate the image data into color component data, perform discrete wavelet transforms on the color component data, perform discrete cosine transforms on low frequency outputs of the discrete wavelet transforms, compress each fixed-size block of image data, and output a fixed-rate compressed bitstream having compressed header data, variable length discrete cosine transform data and variable length high-pass subband data.

17. The method defined in claim 1 further comprising:
    performing two-dimensional discrete wavelet transforms on the green color components.

18. The method defined in claim 17, wherein the discrete cosine transforms are performed on low frequency outputs of the one-dimensional discrete wavelet transforms and the two-dimensional discrete wavelet transforms.

* * * * *